Figure 1:
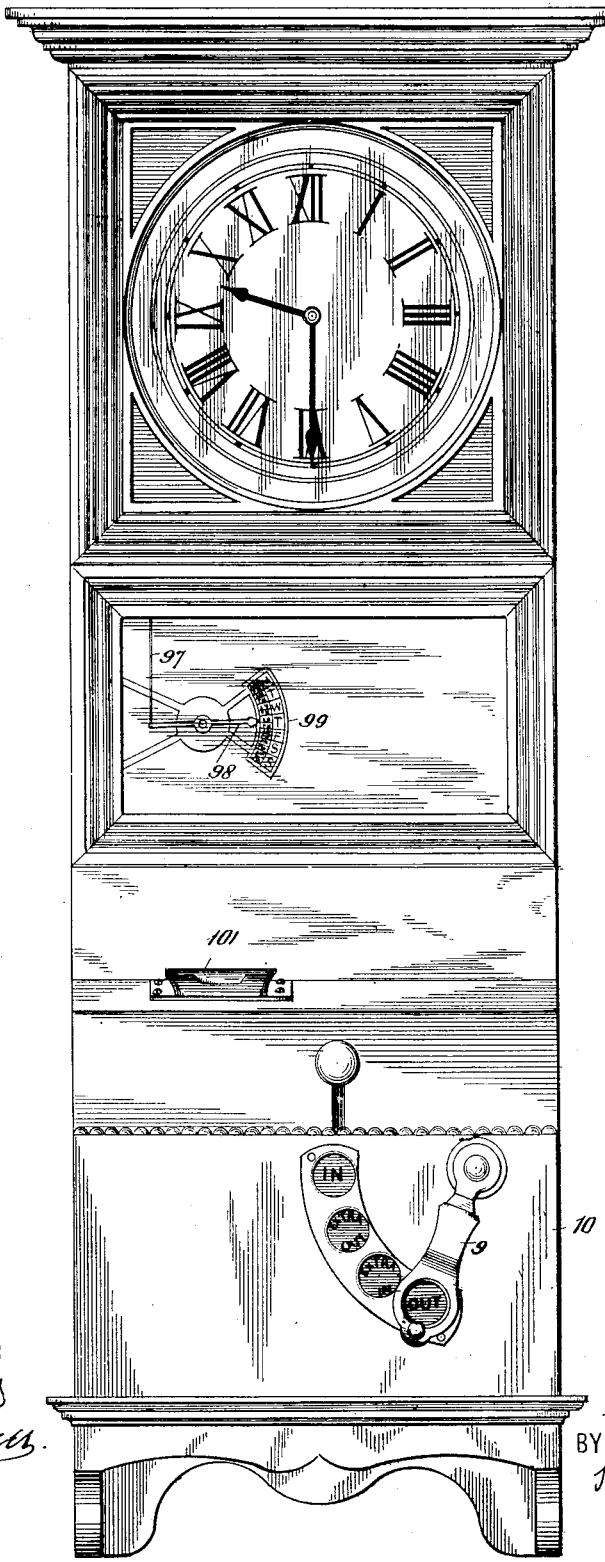

No. 671,126. Patented Apr. 2, 1901.
W. LE G. BUNDY.
TIME RECORDER.
(Application filed Apr. 10, 1899.)
(No Model.) 8 Sheets—Sheet 1.

Fig.1,

WITNESSES:

INVENTOR
Willard Le Grand Bundy
BY Kenyon & Kenyon
ATTORNEYS

No. 671,126. Patented Apr. 2, 1901.
W. LE G. BUNDY.
TIME RECORDER.
(Application filed Apr. 10, 1899.)
(No Model.) 8 Sheets—Sheet 2.

WITNESSES:

INVENTOR
Willard LeGrand
Bundy
BY
Kenyon & Kenyon
ATTORNEYS

No. 671,126. Patented Apr. 2, 1901.
W. LE G. BUNDY.
TIME RECORDER.
(Application filed Apr. 10, 1899.)
(No Model.) 8 Sheets—Sheet 3.

WITNESSES:

INVENTOR
Willard Le Grand Bundy
BY
Kenyon & Kenyon
ATTORNEYS

No. 671,126. Patented Apr. 2, 1901.
W. LE G. BUNDY.
TIME RECORDER.
(Application filed Apr. 10, 1899.)
(No Model.) 8 Sheets—Sheet 7.

INVENTOR
Willard Le Grand Bundy
BY
Kenyon & Kenyon
ATTORNEYS

WITNESSES

No. 671,126. Patented Apr. 2, 1901.
W. LE G. BUNDY.
TIME RECORDER.
(Application filed Apr. 10, 1899.)
(No Model.) 8 Sheets—Sheet 8.

WITNESSES:

INVENTOR
Willard Le Grand Bundy
BY
Kenyon & Kenyon,
his ATTORNEYS.

UNITED STATES PATENT OFFICE.

WILLARD LE GRAND BUNDY, OF BINGHAMTON, NEW YORK, ASSIGNOR TO THE BUNDY MANUFACTURING COMPANY, OF NEW YORK.

TIME-RECORDER.

SPECIFICATION forming part of Letters Patent No. 671,126, dated April 2, 1901.

Application filed April 10, 1899. Serial No. 712,385. (No model.)

*To all whom it may concern:*

Be it known that I, WILLARD LE GRAND BUNDY, a citizen of the United States, and a resident of Binghamton, in the county of Broome and State of New York, have invented a certain new and useful Improvement in Time-Recorders, of which the following is a specification.

My invention relates to time-recorders.

It has for its object to produce a time-recorder to print upon the time-card of an operative or workman the time of his arrival or departure and to print such a record at different places upon the time-card for different purposes—as, for example, when the workman is going in or when he is going out of the factory—or for different divisions of time—as, for example, to distinguish the day of the week or to distinguish the forenoon from the afternoon; also, to make a time-recorder for such purposes more certain and accurate in recording, easier and more rapid in operation, and less likely to be tampered with than any device heretofore used for the purpose.

It consists of the novel devices herein shown and described.

In the drawings accompanying this specification and forming part hereof, and in which corresponding reference characters in the different figures represent corresponding parts, I have shown and will now proceed to describe the preferred form of embodiment of my improvement.

Figure 2:
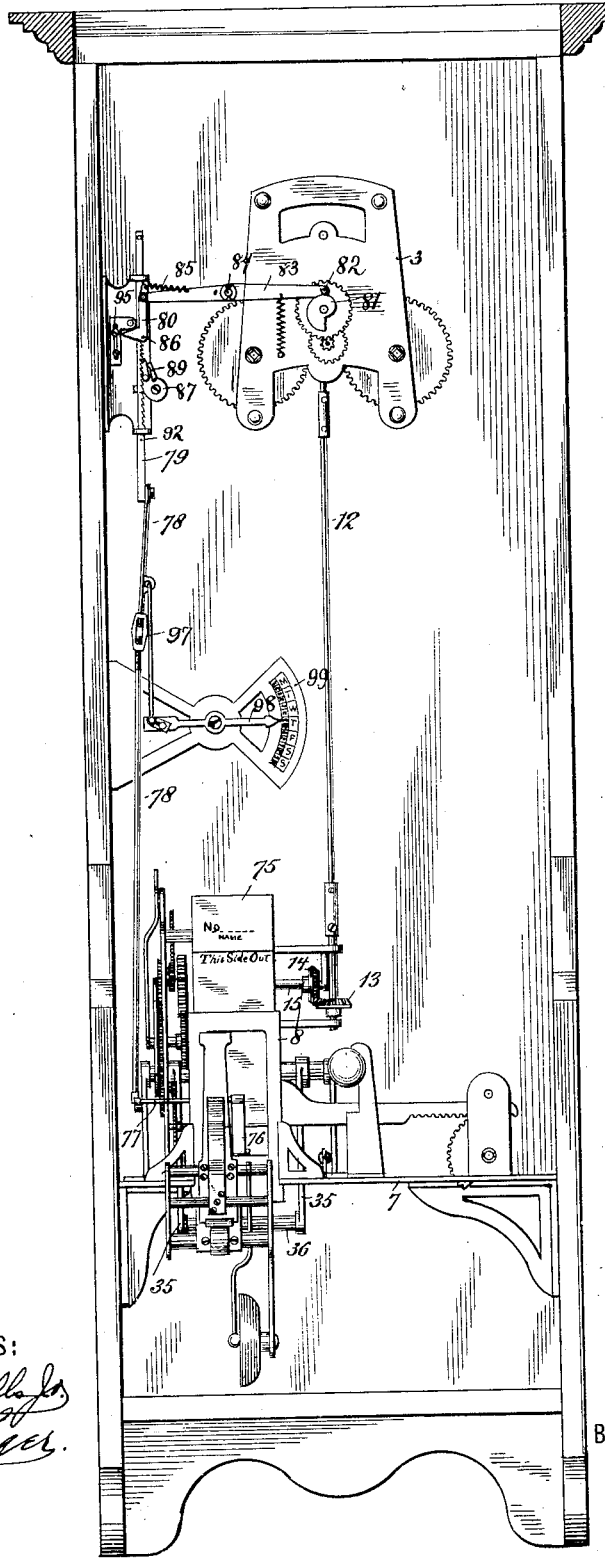
Figure 3:
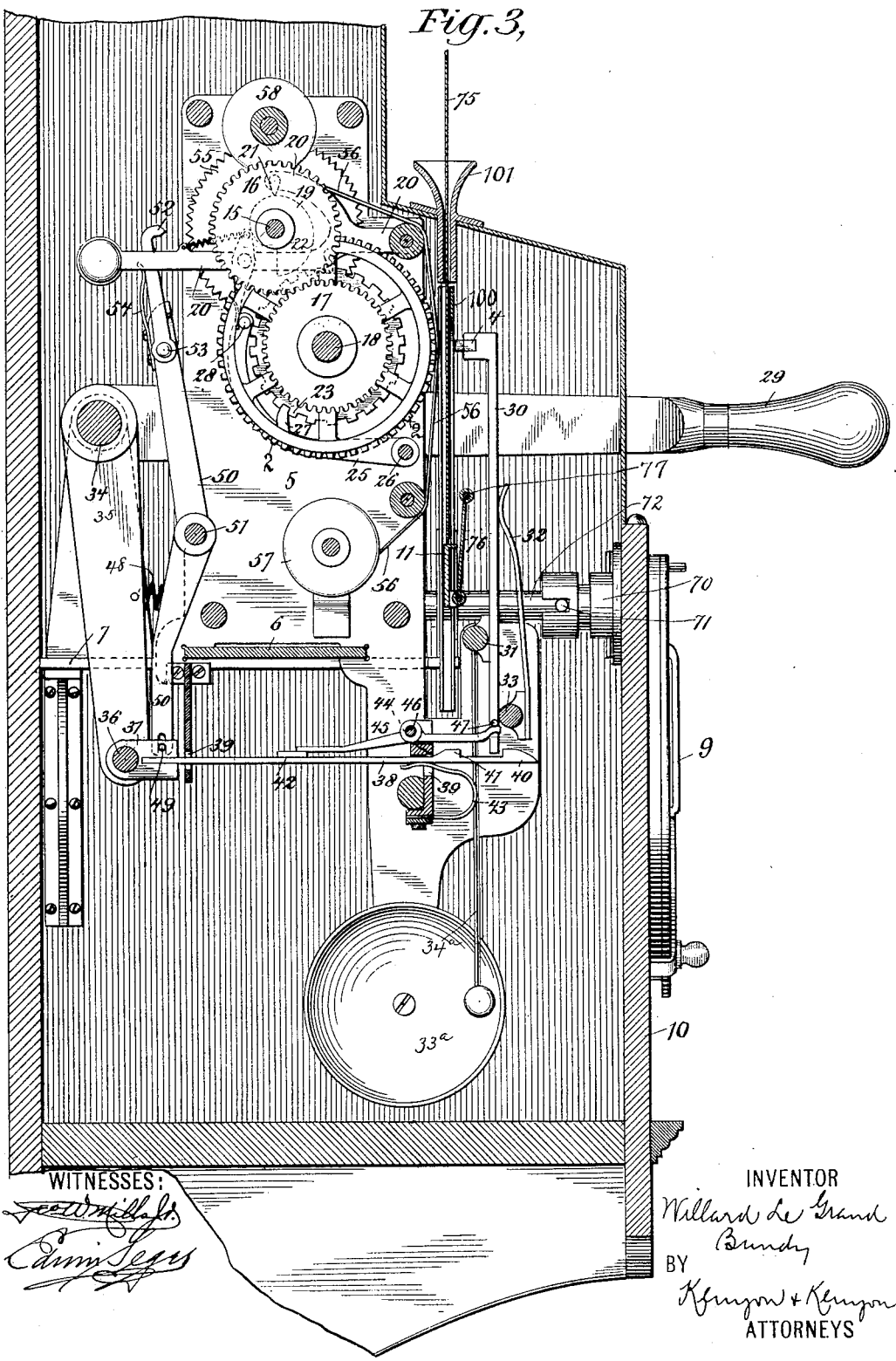
Figure 4:
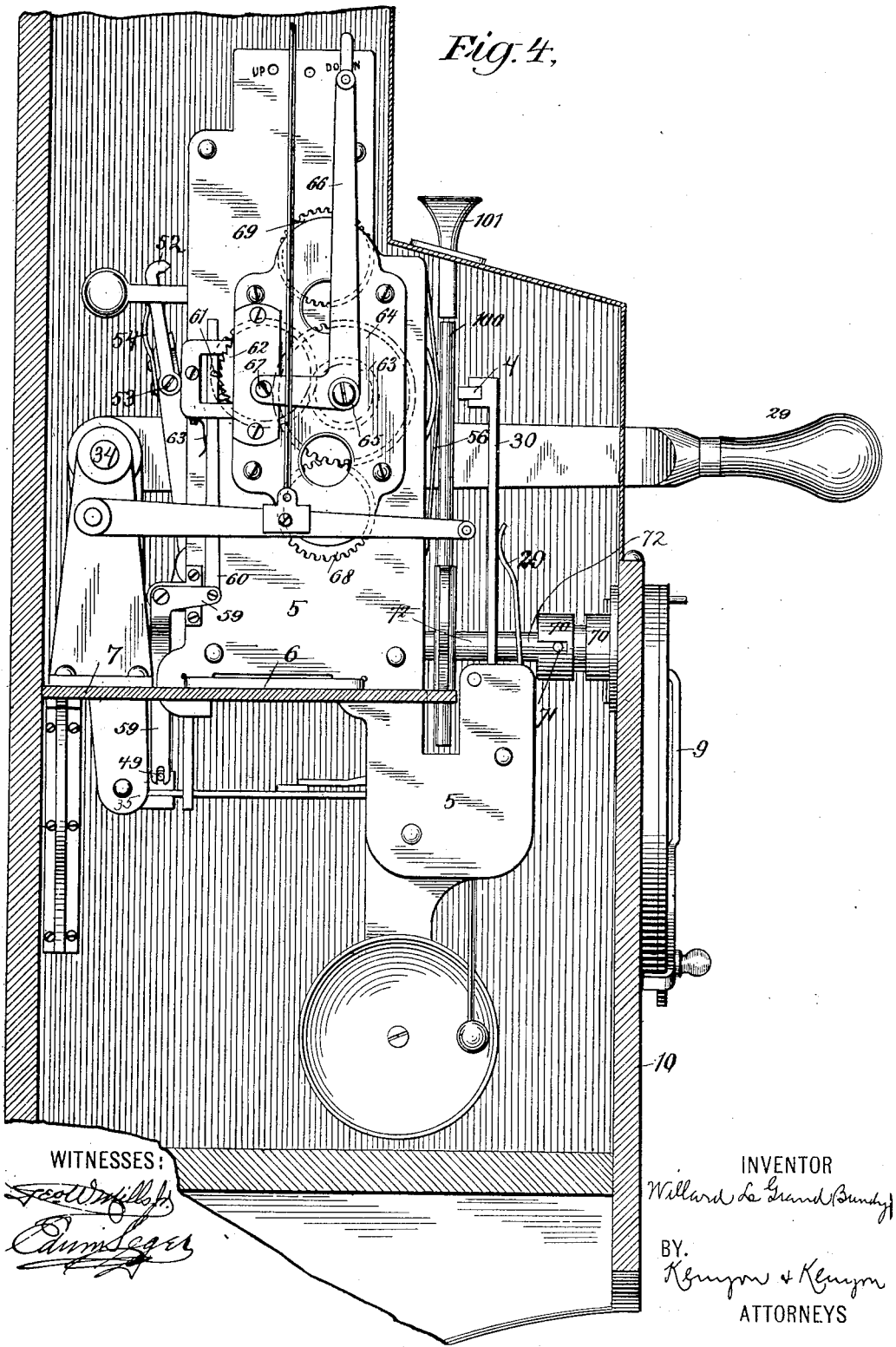
Figure 5:
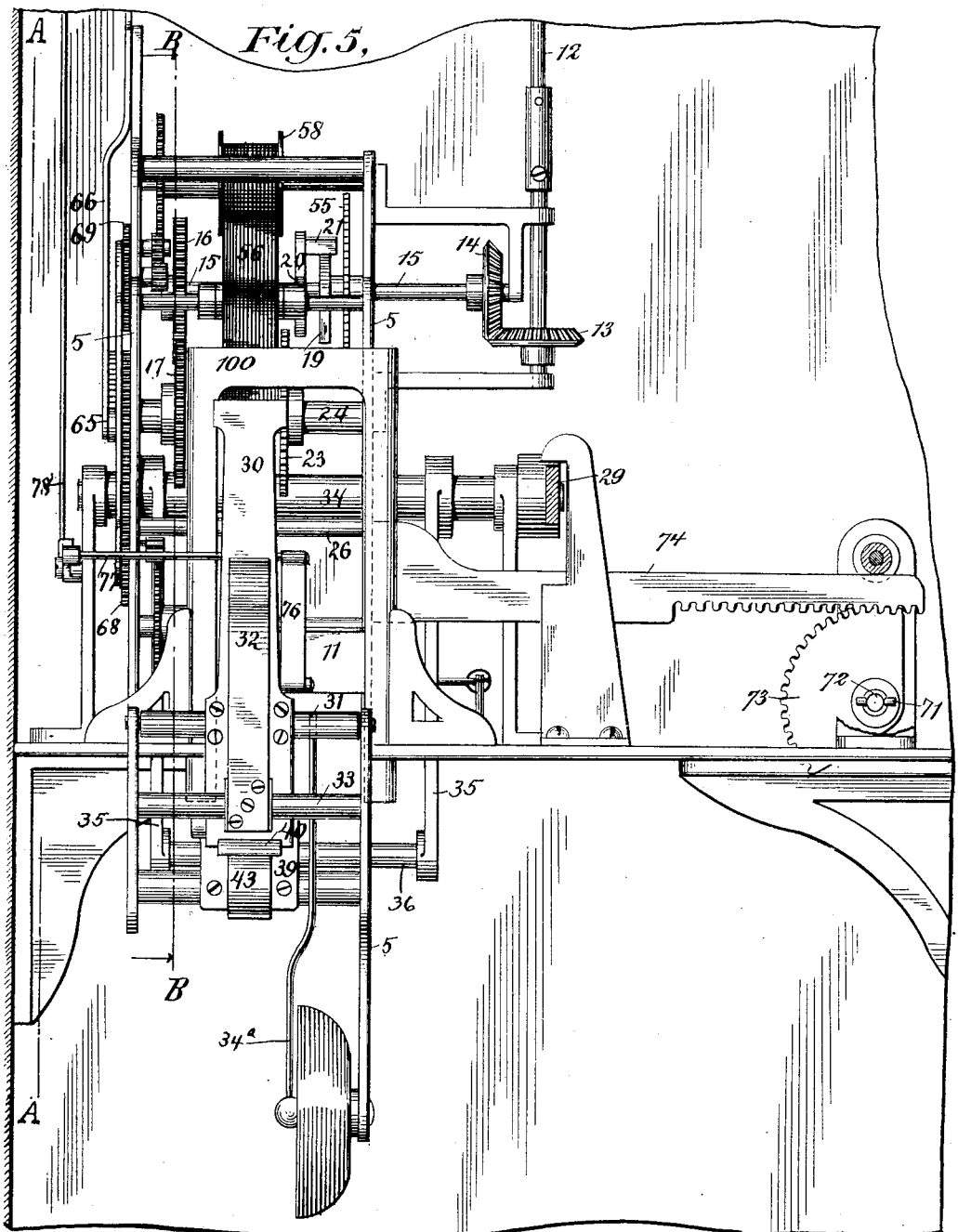
Figure 6:
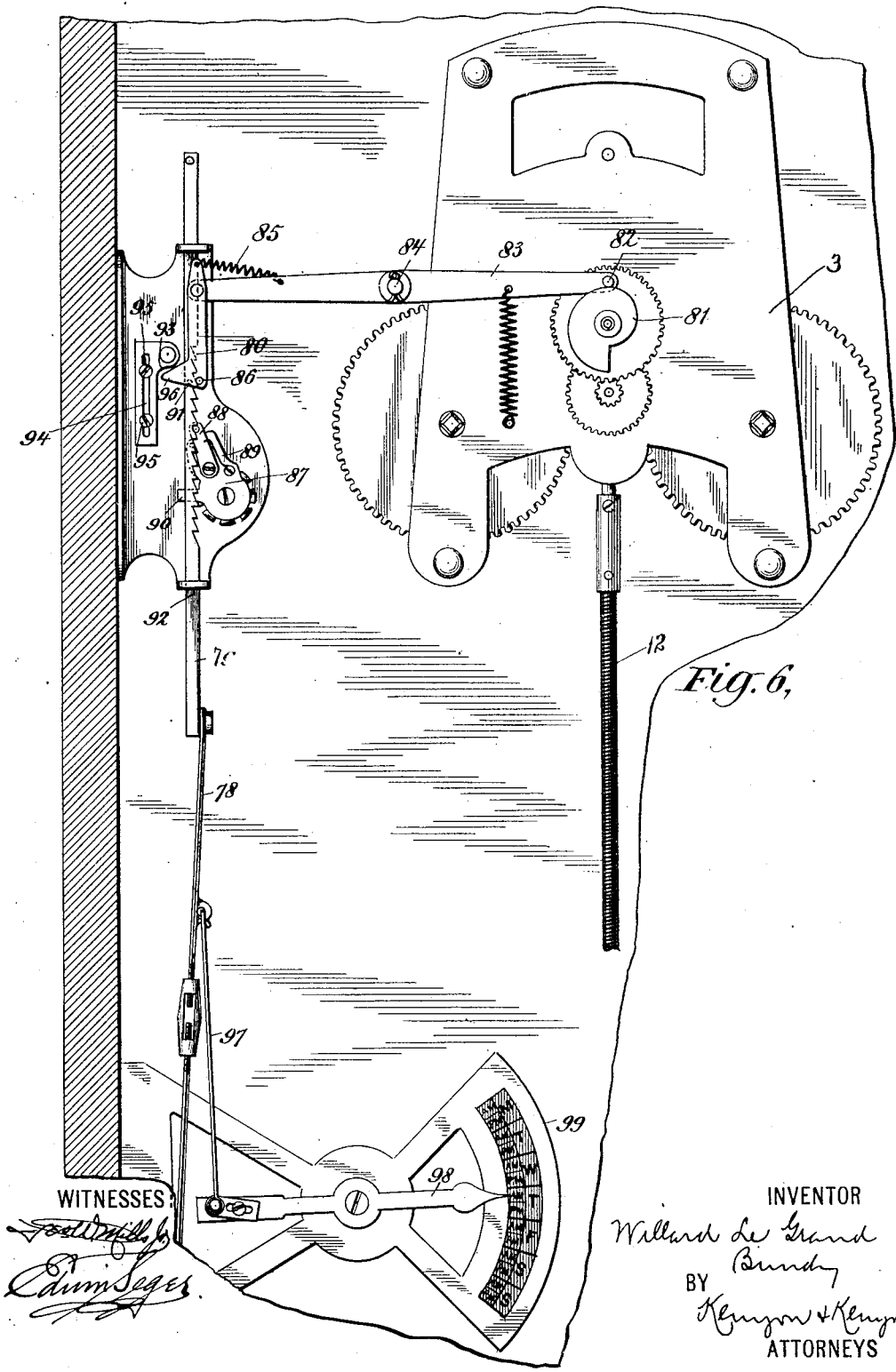
Figure 7:
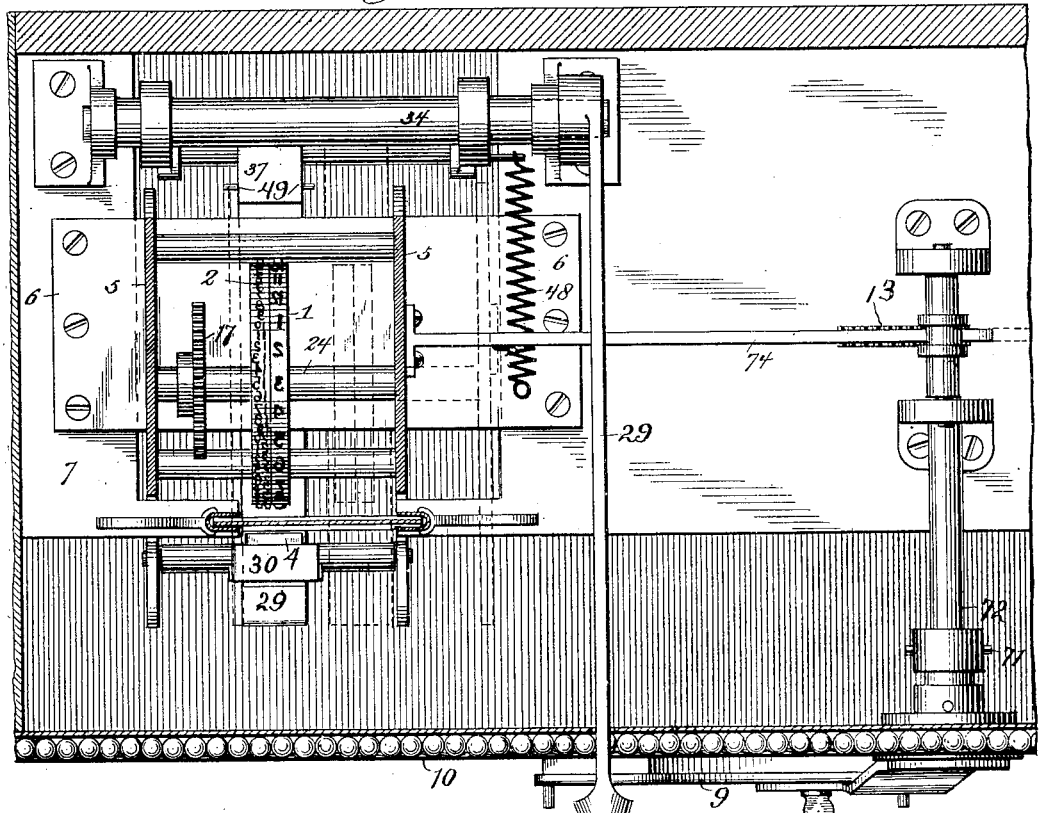
Figures 8, 9:
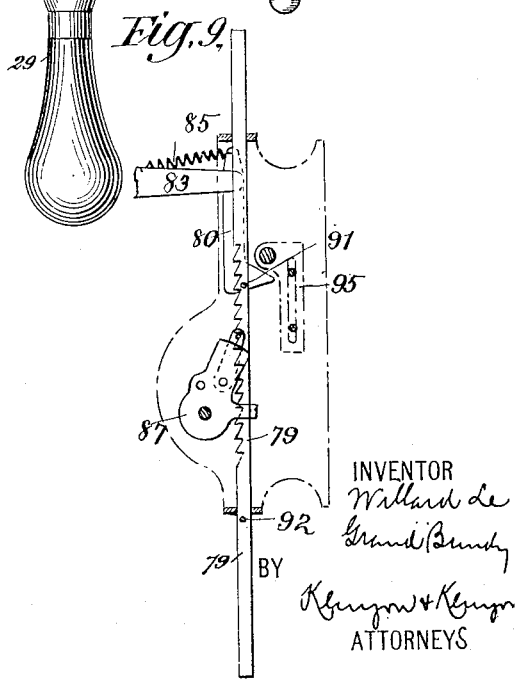
Figure 10:
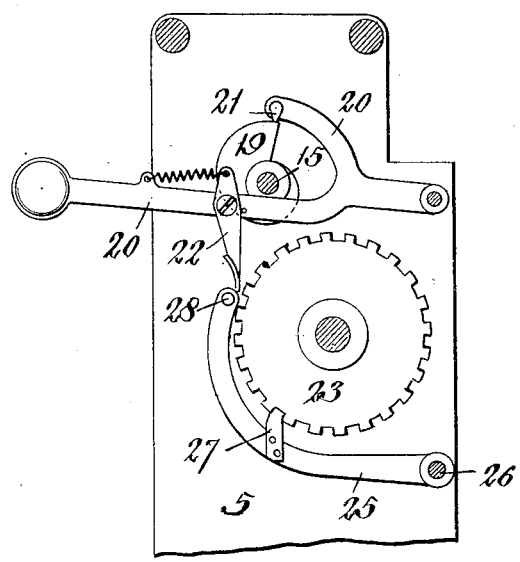

In the drawings, Figure 1 is a front elevation of a time-recorder embodying one form of my invention. Fig. 2 is a front elevation of the same with the front casing and the clock-face and connecting parts removed. Fig. 3 is a vertical cross-section on the line B B of Fig. 5, viewed as shown by the arrow. Fig. 4 is a similar section on the line A A of Fig. 5, viewed as shown by the arrow. Fig. 5 is a front elevation of the parts shown in Fig. 4 with the casing removed. Fig. 6 is a front elevation of the clock-movement and the upper part of the movable rod for imparting vertical motion to the card-support and the mechanism connecting the rod with the time-movement. Fig. 7 is a horizontal section through the lower part of the casing with certain parts of the apparatus omitted. Fig. 8 is a view of one form of time-card adapted for use in my improved machine. Fig. 9 is a detail view of the upper part of the movable rod and its connecting mechanism; and Fig. 10 is a detail, on an enlarged scale, of the mechanism for operating the hour ratchet-wheel.

My improved time-recorder is adapted to be used in connection with time-cards carried by the workmen—such, for example, as the card shown in Fig. 8. Upon this card suitable time-recording mechanism prints the hour and minute of the arrival or departure of the workman. The card is prepared with different subdivisions or spacings, preferably both vertical and horizontal, to represent different conditions—as, for example, when the workman is entering the factory or when he is leaving it—or to represent different divisions of time—as, for example, the different days of the week, and the morning or the afternoon. On the card shown one of the vertical columns (marked "In") is adapted to receive a record of the times when the workman enters the factory. Another column (marked "Out") contains the record of the times the workman leaves. The horizontal lines represent the different days of the week, and each of the days is divided horizontally by a line to represent the forenoon or the afternoon. Two of the vertical columns are headed "Lost time," "Out," "In" for the purpose of recording the times when the workman leaves or enters irregularly.

I provide in my improved machine suitable time-recording mechanism for printing the hour and minute upon the time-cards. As shown, this consists of an hour-wheel 1, a minute-wheel 2, a clock-movement 3 of any suitable construction, mechanism connecting the clock-movement with the hour and minute recording wheels, presently to be described, to cause the time-recording wheels to run synchronously with the clock-movement, a suitable impression device 4, and mechanism, presently to be described, for causing it to bring the time-card and time-recording-wheels into contact to effect the printing, and suitable inking devices, presently to be described.

The time-recording-wheels, the impression device, the inking devices, and some of their connecting parts are mounted upon a movable frame 5. This frame is adapted to move relatively to the card-receiver. Preferably it moves horizontally. As shown, it moves horizontally upon a table 6, secured to a part 7 of the framework of the machine. The purpose of this horizontal movement of the movable frame and the parts which it carries is to bring the time-recording wheels and impression devices opposite the different vertical columns of the time-card, the latter being inserted into a stationary card-receiver 100, secured to the framework 7 of the machine, and this horizontal movement is controlled by the operative through handle 9 on the outside of the casing 10 of the machine in the manner presently to be described.

A movement in the card-receiver (preferably a vertical one) is imparted to the time-card by means of a card-support 11, which, as shown, is movable vertically in the stationary card-receiver and is connected by suitable mechanism, presently to be described, with the clock-movement and is actuated by it so that at certain regular intervals of time the card-support is moved vertically a predetermined distance, thus bringing the printing-line of the time-recording wheels and the impression devices opposite different horizontal spaces upon the card.

I will now proceed to describe in detail the specific mechanism shown in the drawings for the above purposes.

The clock-movement 3 may be of any suitable form and will not be described in detail. Motion is imparted from the clock-movement by flexible shaft 12 to minute-wheel 2 through the following chain of mechanism—namely, gears 13 14, shaft 15, gear 16, gear 17 on shaft 18, upon which shaft minute-recording wheel 2 is fixedly mounted. Motion is imparted to the hour-wheel 1 from shaft 15 by means of cam 19 on shaft 15, forked lever 20, having toe 21, bearing upon cam 19 at the end of one fork and spring-pressed pawl 22 upon the other arm, the latter engaging with the teeth of ratchet-wheel 23, mounted upon sleeve 24 upon shaft 18, hour-wheel 1 being also fixedly mounted upon said sleeve. The vibratory motion given by the cam-lever 20 causes pawl 22 to engage with tooth after tooth of wheel 23 to feed it forward one tooth at a time. A locking-lever 25, pivoted at 26 and having a locking-tooth 27 engaging with the teeth of wheel 23, holds the hour-wheel locked except when pawl 22 feeds the wheel forward, (see Fig. 10,) at which time pawl 22 passes on one side of roller 28 on the end of locking-lever 25, throwing the lever back and raising and locking tooth 27 out of contact with the teeth of wheel 23. On its return pawl 22 passes on the other side of roller 28, as shown in Fig. 3, so as not to interfere with the locking action of the locking arm except at the moment of feeding forward the hour-wheel. As the details of these devices form no part of my invention, and as they are set forth in an application of mine filed November 26, 1898, Serial No. 697,543, for an improvement in time-recorders, they will not be further described.

The impression-hammer is operated by means of handle 29, which projects outside of the casing. The devices for this purpose are as follows: Impression-hammer 4 is mounted upon lever 30, fulcrumed upon stud 31. A spring 32 tends to press hammer 4 against the card when placed in the card-receiver. A stop 33 prevents the hammer from being pressed forward too far. In order to operate hammer 4, handle 29 is depressed. This rotates rock-shaft 34, to which the handle is secured, and rocks arms 35, secured to the rock-shaft, and rod 36, carried by the arms, to the left, as viewed in Fig. 3. Loosely mounted upon rod 36 is a movable piece 37, which is adapted to slip along rod 36 as the movable frame is moved horizontally from one side to the other. Piece 37 carries a rod 38, which projects through openings 39 39 in the framework of the machine and carries at its farther end an arrow-head 40 and an inclined surface 41 and also a block 42. As handle 29 is depressed piece 37 is pulled to the left, as viewed in Fig. 3, and rod 38 with it. The vertical side of arrow-head 40 catches the lower end of lever 30, being held up by spring 43, and withdraws hammer 4 from the card. When this motion to the left has proceeded a sufficient distance, inclined surface 41 is forced downward by cam-surface 44, secured to the framework of the machine, thus releasing lever 30 from arrow-head 40, whereupon spring 32 causes hammer 4 to give a sharp blow upon the time-card, causing the hour and minute to be printed upon the time-card. To insure that the handle 29 shall be depressed far enough to effect the printing, I provide a lever 45, pivoted to the framework of the machine at 46 and having one end adapted to fall down behind block 42 on rod 38, thus preventing the return of rod 38 until the printing blow has been delivered. The end of lever 45 is removed from behind block 42 to permit the return of handle 29 and rod 38 by pin 47 on lever 30 striking against the curved upper end of lever 45, as shown in Fig. 3. Spring 48, secured to one of the arms 35, causes handle 29 and its connecting parts to return to their normal position after the printing blow has been delivered. In the normal position of the parts hammer 4 is withheld from contact with the card by means of stop 33; but the action of spring 32 upon elastic lever 30 causes the upper part of that lever to spring forward to deliver the blow. In this manner a very sharp blow is delivered, printing the time sharply and legibly.

33$^a$ is a bell attached to a downward extension of the movable frame 5, and 34$^a$ is the bell-hammer, the arm of which is fulcrumed to the stud 31. When the impression-hammer arm is drawn back, it will rock the stud 31, to which it is secured, and the hammer 34ª, also secured to said stud, will at the same time be retracted. When the hammer-arm 30 is released, the spring 32 will not only force said arm forward, but at the same time will cause the hammer 34ª to be driven in the opposite direction. The two hammer-arms 30 and 34ª being both secured to the same stud 31 and extending in opposite directions from each other constitute a lever of the first class, so that when one of said arms moves in one direction the other arm will move in the opposite direction.

During the printing operation I preferably lock the printing minute-wheel by means of a pin 49, which projects from both sides of piece 37. Upon one side it projects between the two forks of the end of a lever 50, loosely pivoted at 51 in the framework of the machine and carrying at its upper end a tooth 52, pivoted to the lever at 53 and pressed by spring 54. When handle 29 is depressed, lever 50 is moved on its pivot, so as to throw tooth 52 into contact with the teeth of gear-wheel 55, which is fixedly mounted upon shaft 15, thus holding the minute-wheel rigid during the printing operation.

The inking devices shown consist of an ordinary inking-ribbon 56, which passes between rolls 57 and 58. The ribbon is fed forward a slight distance at each movement of handle 29 by the following devices—to wit, bell-crank lever 59, the forks at the end of which engage with the opposite end of a pin 49 from that of the forked end of lever 50, and thus a rocking motion is imparted to bell-crank lever 59 as handle 29 is depressed. Rod 60 is pivoted to the other end of bell-crank lever 59 and carries a tooth 61, adapted to engage with the teeth of ratchet-wheel 62. A spring 63 tends to press lever 60 against ratchet-wheel 62. As bell-crank lever 59 is rocked tooth 61 feeds the ratchet-wheel forward a certain predetermined distance. Ratchet-wheel 62 engages with gear-wheel 63, rotating gear-wheel 64, which is secured to and rotates with gear-wheel 63. The shaft 65 of wheels 63 and 64 is secured to a lever 66, pivoted at 67 to the framework. By moving lever 66 into any one of the three positions it may occupy, as shown in Fig. 4, gear-wheel 64 is brought into connection with a lower gear-wheel 68 on the shaft of roll 57 or into contact with gear-wheel 69 on the shaft of roll 58 or into an intermediate position between the two. By moving lever 66 into one or the other of these three positions the inking-ribbon is fed up or down or is not fed at all each time handle 29 is operated.

The time-recording wheels, the ink-ribbon and its feeding devices, and the impression-platen and some of its connections are all mounted upon movable frame 5, to which a horizontal movement is imparted, as will presently be described. Handle 29, rock-shaft 34, arms 35, and rod 36, however, are immovable horizontally. I therefore make piece 37 loose upon rod 36, so that it may move horizontally to the right or left with movable frame 5.

Horizontal motion is imparted to movable frame 5 by the following-described devices: In the time-card shown in the drawings there are four vertical columns, as shown in Fig. 8. I therefore have shown in the devices illustrated in the drawings means for moving the movable frame horizontally into any one of four positions. This is done by means of swinging handle 9, secured to sleeve 70. A pin 71 from rock-shaft 72 projects into a slot in sleeve 70, as shown in Fig. 4, so that as handle 9 is swung shaft 72 will rock with it. Mounted upon shaft 72 is a segmental pinion 73, which meshes with a rack upon rod 74, secured to movable frame 5, as shown in Fig. 7. By swinging handle 9 in one of the four positions shown in Fig. 1 the movable frame will be moved horizontally into the corresponding position, thus bringing the printing-line of the time-recording mechanism opposite the corresponding column of the time-card in the stationary card-receiver.

In order to bring the spaces in any of the vertical columns representing the different days of the week and the forenoon and the afternoon opposite the printing-line of the time-recording mechanism, I preferably employ in the stationary card-receiver a movable card-support for supporting the time-card of the operative, and I preferably connect this support by suitable means with the clock-movement, so as to automatically move the card-support at regular stated intervals of time a certain predetermined distance in order to bring the appropriate space upon the time-card representing the day of the week and the forenoon or afternoon opposite to the printing-line of the time-recording mechanism. My preferred devices for this purpose are as follows: The card-support 11 has a shelf upon which the card 75 is supported. The card-support is secured by hinged arm 76 and arm 77 to a vertically-movable rod 78. (See Figs. 2 and 5.) The latter has connected with it a rack 79, which is adapted to be fed vertically by a spring-pressed pawl 80, actuated by the clock-movement. A cam 81 is mounted upon the shaft of the hour-wheel of the clock-movement. Upon this cam rides a roller 82, secured to a spring-lever 83, pivoted at 84, and carrying at its other end spring-pressed pawl 80. The spring of this pawl is shown in Fig. 6 as spring 85 and tends to hold a pin 86, projecting from one side of the pawl 80, against the teeth of rack-rod 79. A pawl 87, frictionally mounted upon the framework, has a tooth 88, pressed by spring 89, which in one position of the pawl engages with the teeth of the rack to prevent the latter from falling.

90 is a projection from frictional pawl 87. Pin 91, projecting from the side of rack-rod 79, is adapted to engage with projection 90 of pawl 87, when the rack-rod is in its lowest position, to move frictional pawl 87 into engagement with the rack-rod to prevent a further downward movement. Pin 92, also projecting from the side of rack-rod 79, is adapted to engage with projection 90, when the rack-rod has reached its highest position, to move pawl 87 out of engagement with the teeth of the rack in order to permit the rod to fall to its lowest position.

93 is a cam secured to the framework and adjustable by means of slot 94 and screws 95. The toe 96 of spring-pressed pawl 80 strikes against this cam-surface when rack-rod 79 has nearly reached its highest position, when the slight further upward movement of the rack-rod causes cam-surface 93 to force pawl 80 and its pin 86 out of engagement with the teeth of the rack, thus permitting the rack to fall. At the same time pin 92 engages with projection 90 of frictional pawl 87, thus removing it also from contact with the teeth of the rack, permitting rack 79 and with it rod 78 to fall to their lowest positions. Thus at every revolution of cam 81—that is, at the end of each twelve hours—rod 78 and with it card-support 11 will be raised a slight distance, corresponding to the distance between "P. M." and "A. M." or "A. M." and "P. M." on the time-card shown in Fig. 8. The various pawls and pins and cam-surface connected with rack 79 are so arranged that the card-support 11 will be raised fourteen times and will then be dropped to the bottom.

Connected to rod 78 by rod 97 is an index-finger 98, adapted to move over dial 99, which is exposed to view, as shown in Fig. 1, thus indicating to the operative whether the mechanism is correctly representing the day and the part of the day.

100 is the card-receiver. This receiver is stationary and has a mouth 101 projecting through the casing. As the card-receiver is stationary and always in the same position, the workmen can more readily deposit their time-cards and can operate the machine with greater rapidity than when the card-receiver is a shifting one.

My improved devices for moving the card-support vertically are actuated by mechanism driven directly by the mainspring or mainsprings of the clock-movement. They are therefore always in running order as long as the clock-movement itself runs. I am enabled to accomplish this by using a cam driven continuously by the clock-movement itself. This is a great advantage, as the workman knows that when the pendulum is swinging or the clock running the rest of the apparatus is in working order.

In my improved device the card cannot bind or slip in the card-receiver, as it is always supported in precisely the same manner. For this reason it is not necessary to make the time-card a tight fit in the card-receiver. All of the operating mechanism except those parts to be moved by the workman are contained within the casing and cannot be easily tampered with. The devices for imparting a vertical motion to the card-support have a positive movement, which is of advantage.

Many modifications can of course be made in the devices shown in the drawings without departing from my invention.

What I claim as new, and desire to secure by Letters Patent, is—

1. In a time-recorder the combination of a card-receiver for receiving the time-card of the operative, constructed and arranged to permit the card to be moved longitudinally of the receiver but not in a direction transverse thereto, means connected with and actuated by a clock-movement for moving the card in said direction at predetermined intervals to shift its position relative to the printing-line, time-recording mechanism, a movable frame, upon which the same is mounted, means under the control of the operative for moving said frame in a direction transverse to that of the movement of the card, whereby with a card adapted to have motion in one direction only a record of the time of the actuation of the time-recorder may nevertheless be made upon any desired place upon the card.

2. In a time-recorder the combination of a card-receiver for receiving the time-card of the operative constructed and arranged to permit the card to be moved longitudinally of the receiver but not in a direction transverse thereto, a card-support in the card-receiver movable longitudinally therein, means connected with and actuated by a clock-movement for moving the card-support and card in said direction at predetermined intervals to shift the position of the card relative to the printing-line, time-recording mechanism, a movable frame, upon which the same is mounted, means under the control of the operative for moving said frame in a direction transverse to that of the movement of the card, whereby with a card adapted to have motion in one direction only a record of the time of the actuation of the time-recorder may nevertheless be made upon any desired place upon the card.

3. In a time-recorder the combination of a stationary card-receiver for receiving the time-card of the operative constructed and arranged to permit the card to be moved vertically but not horizontally, a card-support in the card-receiver movable vertically therein, means connected with and actuated by a clock-movement for moving the card-support and card vertically at predetermined intervals to shift the position of the card relative to the printing-line, time-recording mechanism, a movable frame, upon which the same is mounted, means under the control of the operative for moving said frame horizontally whereby with a card adapted to have motion in one direction only a record of the time of the actuation of the time-recorder may nevertheless be made upon any desired place upon the card.

4. In a time-recorder, the combination of time-recording mechanism, a card-receiver, a card-support movable vertically therein for supporting the time-card of the operative, mechanism for imparting such vertical movement to the card-support at predetermined intervals, actuated by the mainspring of the clock-movement, whereby a record of the time of the actuation of the time-recorder by the operative will be made in the proper place upon the time-card, substantially as set forth.

5. In a time-recorder the combination of time-recording mechanism, a movable frame upon which the same is mounted, means under the control of the operative for moving said frame horizontally, and a stationary card-receiver, a card-support movable vertically therein for supporting the time-card of the operative, mechanism for imparting such vertical movement to the card-support at predetermined intervals, actuated by the mainspring of the clock-movement, whereby a record of the time of the actuation of the time-recorder by the operative will be made in the proper place upon the time-card, substantially as set forth.

6. In a time-recorder the combination of time-recording mechanism, a stationary card-receiver, a card-support movable vertically therein for supporting the time-card of the operative, a cam driven by the mainspring of the clock-movement, mechanism connecting said cam with the card-support adapted to impart a vertical movement to the card-support at predetermined intervals, whereby a record of the time of the actuation of the time-recorder by the operative will be made in the proper place upon the time-card, substantially as set forth.

7. In a time-recorder, the combination of time-recording mechanism, a stationary card-receiver, a card-support movable vertically therein for supporting the time-card of the operative, a vertically-movable rod connected with the card-support, means actuated by the mainspring of the clock-movement for raising the rod a predetermined distance at regular stated intervals of time, for holding it in such positions and for releasing it when it has reached its highest position to permit it to fall to its lowest position, whereby a record of the time of the actuation of the time-recorder by the operative will be made in the proper place upon the time-card, substantially as set forth.

8. In a time-recorder the combination of time-recording mechanism, a card-receiver, a card-support movable vertically therein for supporting the time-card of the operative, a vertically-movable rod connected with the card-support and having a rack connected with it, a pawl frictionally secured to the framework of the machine and adapted in one position to engage with the rack to hold the rod from falling, a spring-pressed pawl adapted to engage with the teeth of the rack, a cam driven by the mainspring of the clock-movement, connecting mechanism between the cam and the spring-pressed pawl, whereby at stated intervals the said pawl will engage with the rack and lift the rod a predetermined distance, a cam-surface against which a connecting part of the spring-pressed pawl will strike when the rod has reached its highest point to force the said pawl out of contact with the rack, a projection on the rod adapted to strike the frictional pawl to move it out of contact with the rack, when the rod has reached its highest point, and another projection upon the rod adapted to strike the frictional pawl to move it into contact with the rack, when the rod has reached its lowest point whereby the card-support will be automatically moved upward a predetermined distance at regular stated intervals of time, will be securely held in such positions, will be automatically released when it has reached its highest position and allowed to fall to its lowest position, and will be again automatically raised and so on, whereby a record of the time of the actuation of the time-recorder by the operative will be made in the proper place upon the time-card, substantially as set forth.

9. In a time-recorder the combination of time-recording wheels, connected to and driven by a suitable clock-movement, an impression-platen, suitable inking devices, a movable frame upon which the said time-recording wheels and hammer are mounted, means under the control of the operative for moving said frame horizontally, a handle for operating the impression-hammer, adjustable sliding connections between the handle and the platen so arranged as to be adapted to operate the platen in any position of the movable frame, and a card-receiver for receiving the time-card of the operative, whereby a record of the time of actuation of the time-recorder by the operative will be made in the proper place upon the time-card, substantially as set forth.

In testimony whereof I have signed my name to this specification in the presence of two subscribing witnesses.

WILLARD LE GRAND BUNDY.

Witnesses:
EDWIN SEGER,
GEO. W. MILLS, Jr.